Feb. 15, 1955  F. RENNER  2,702,000
APPARATUS FOR MAKING COFFEE, TEA AND SIMILAR INFUSIONS
Filed April 6, 1950  3 Sheets-Sheet 1
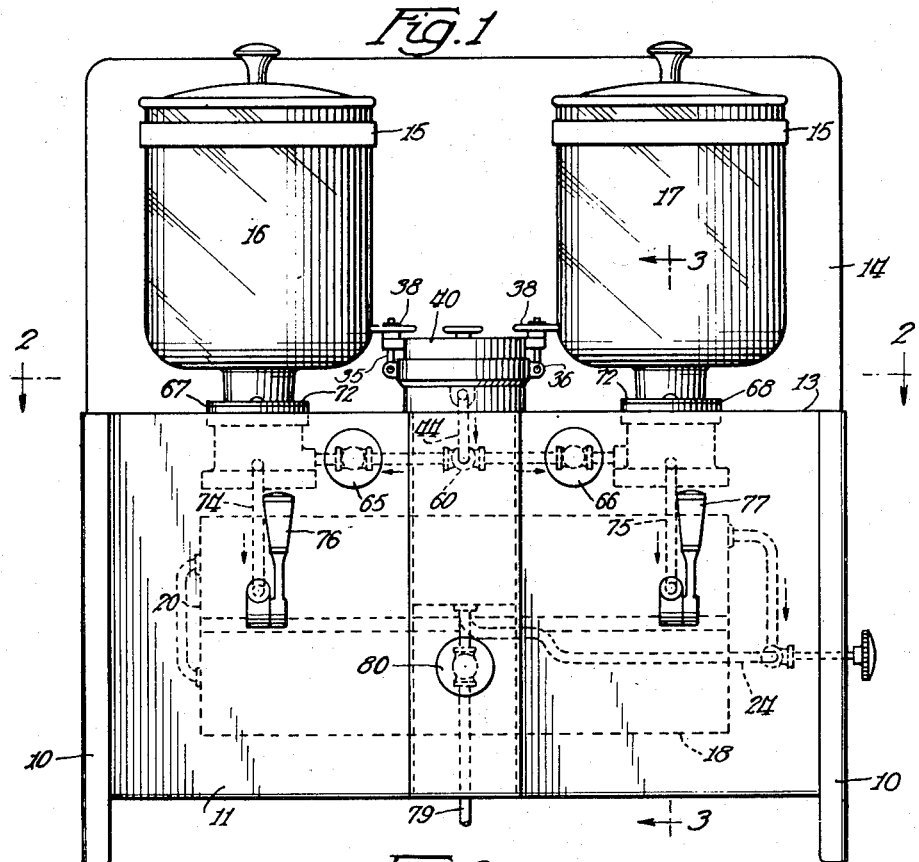
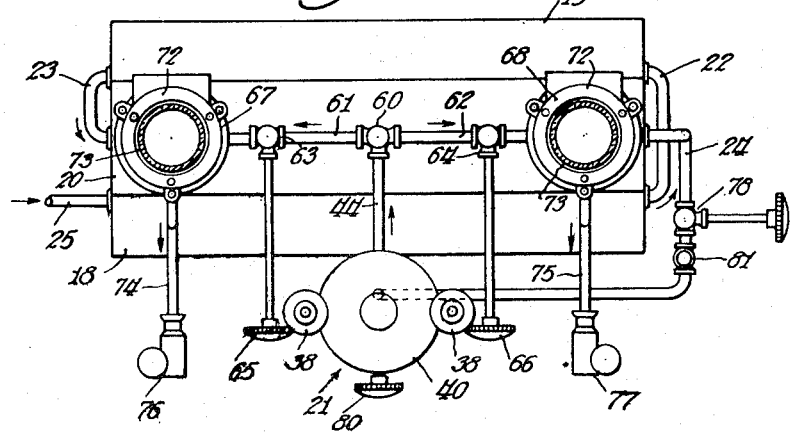
Inventor
Frank Renner
By Zabel and Gritzbaugh Attys.

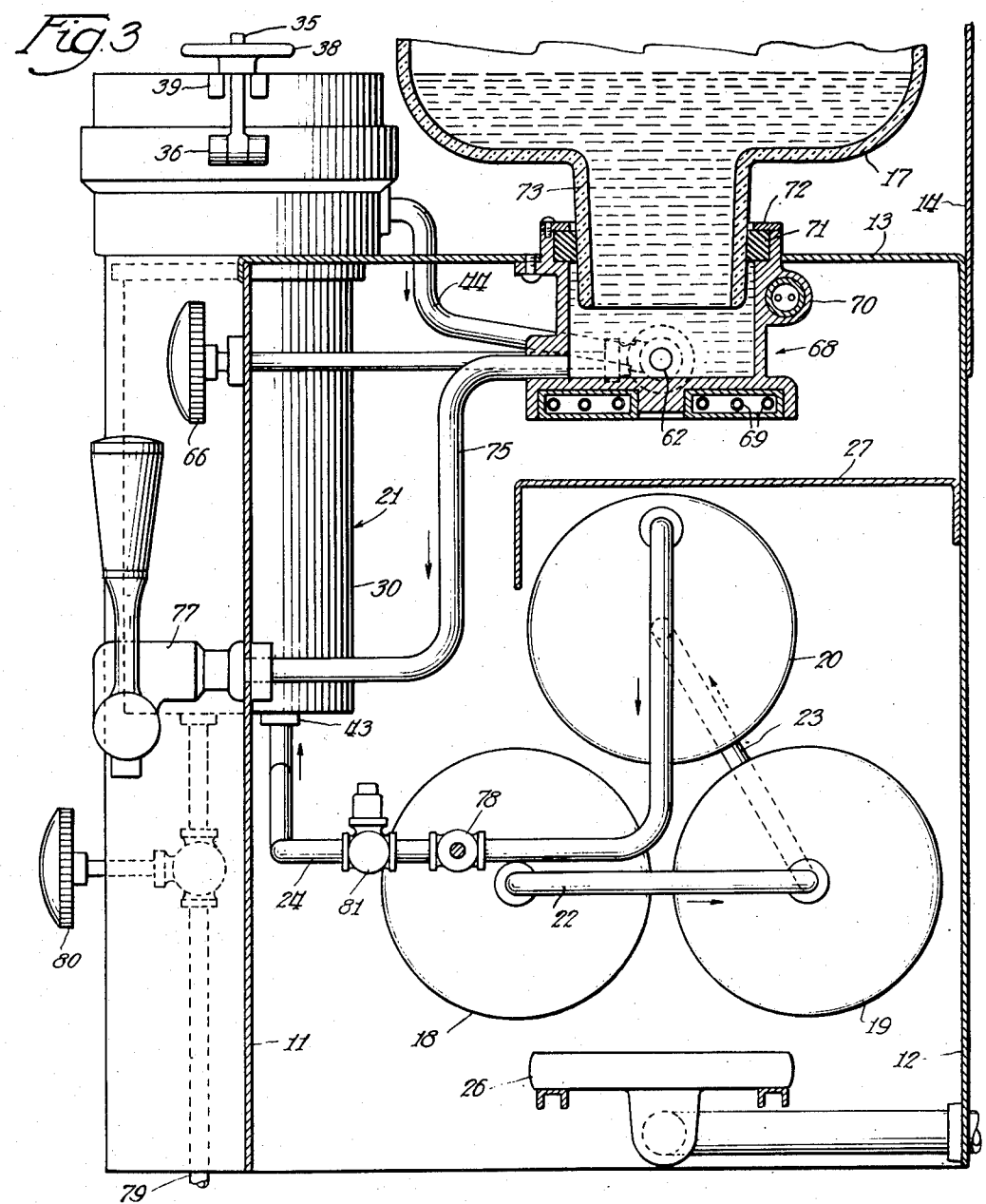

Inventor
Frank Renner
By Zabel and Gitzbaugh
Att'ys

United States Patent Office 2,702,000
Patented Feb. 15, 1955

2,702,000

APPARATUS FOR MAKING COFFEE, TEA, AND SIMILAR INFUSIONS

Frank Renner, Park Ridge, Ill.

Application April 6, 1950, Serial No. 154,270

4 Claims. (Cl. 99—303)

This invention relates to an apparatus for making coffee, tea and similar infusions.

The coffee bean contains two soluble substances, coffee and tannin. In general, the caffeine is more readily soluble in water than tannin; its solubility increases markedly at temperatures in excess of 150° F. The infusion should desirably contain as much caffeine as possible and as little tannin as possible. Since the discrepancy between the solubilities is more marked at high temperatures, an improved infusion can be obtained by extraction at temperatures substantially in excess of 150° F. Improved selectivity can also be obtained by extracting under pressure. The extraction is desirably carried out at a rate of from .3 to .4 gallon per minute. If the rate is appreciably slower, too much tannin will be extracted; if it is appreciably faster, too little caffeine will be extracted. In any event it is desirable to provide apparatus in which there is no contact between the coffee grounds and the infusion after extraction; the grounds should not be permitted to drip into the infusion since this increases the tannin content.

It is an object of this invention to provide improved apparatus for making a substantial quantity of coffee at one time, which apparatus is suitable for use in restaurants and the like, and in which the extraction can be carried out in a manner to maintain a comparatively low concentration of tannin in the infusion.

In this connection, I have provided apparatus which forms the extraction at a controlled rate of speed and under the proper degree of heat and pressure and which provides a reservoir so that a substantial quantity of coffee or other infusion can be prepared at one time.

Another object of this invention is to provide a removable reservoir, and preferably, a reservoir in the form of a removable glass bowl. Thus, the reservoir can be removed for cleaning; furthermore, a glass bowl increases the commercial appeal of the device since its condition is readily visible to the operator and to his customers.

Still another object of this invention is to provide an improved means for removably mounting a reservoir and which serves to maintain the infusion in the reservoir at proper serving temperature, and also which sets up convection currents in the reservoir which will prevent accumulation of any sediment.

Still another object of this invention is to provide apparatus having two or more reservoirs which are connected to a single extractor in such a manner that an infusion may be dispensed from one of the reservoirs while the infusion for the second reservoir is being made. Thus, a continuous supply of infusion is provided. In the alternative, different types of beverages may be prepared for the different reservoirs, such as coffee for one reservoir and tea or cocoa for the other.

It is a further object of this invention to provide improved hot water supply means which avoids the usual temperature drop which is incident to the commingling of fresh cold water with the hot water withdrawn for extraction.

Another object is to provide in an apparatus of this type an improved extractor in which the coffee grounds are contained in a removable cartridge. Thus, the amount of coffee can be pre-measured, and the spent grounds can readily be removed.

A still further object is to provide improved means for sealing the cartridge into the extractor so as to prevent by-passing of the water around the coffee grounds, and which sealing means does not require the sealing pressure to be transmitted through the relatively thin gauge sheet metal of which the cartridge is constructed. In this connection, I have provided improved means for sealing the extractor which is operative even when the cartridge is removed, thus permitting hot water to be run into the bowls when this is desired.

Other objects, features and advantages will become apparent as the description proceeds.

With reference now to the drawings in which like reference numerals designate like parts:

Fig. 1 is a front view of a preferred embodiment of this invention;

Fig. 2 is a horizontal section taken along line 2—2 of Fig. 1; the casing and other structural elements being omitted for purpose of clarity;

Fig. 3 is an enlarged sectional view taken along line 3—3 of Fig. 1;

Figure 4:
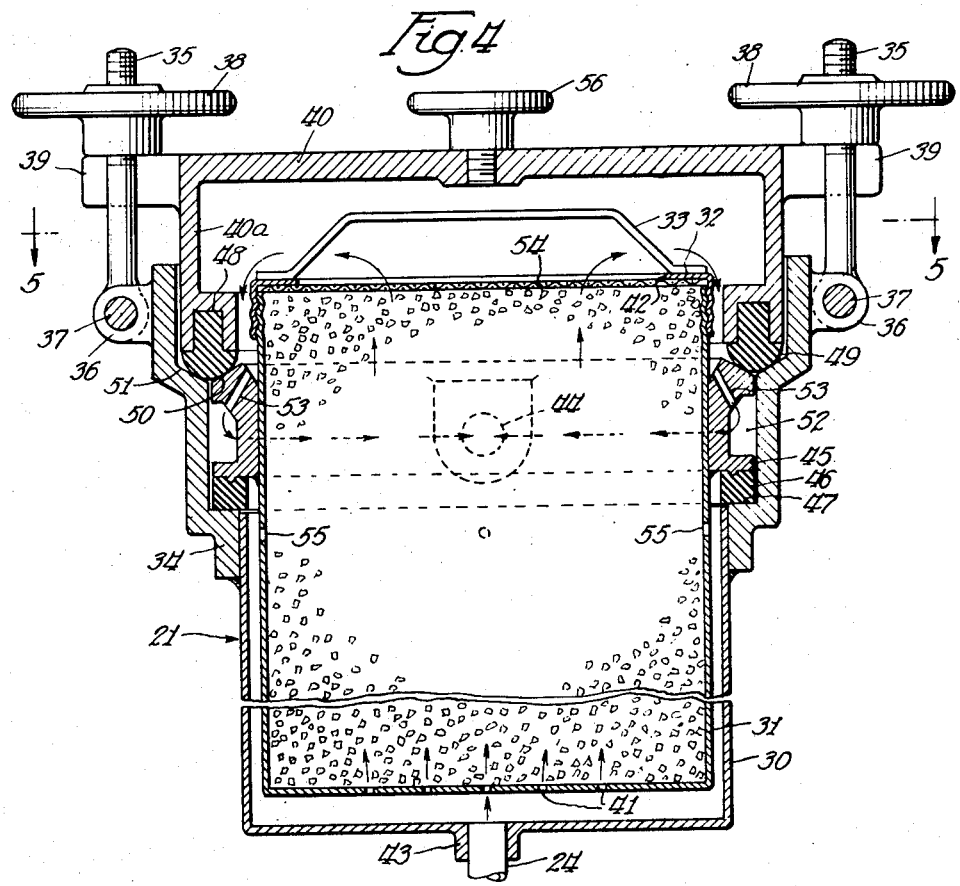
Fig. 4 is a vertical section taken through the extractor.
Figure 5:
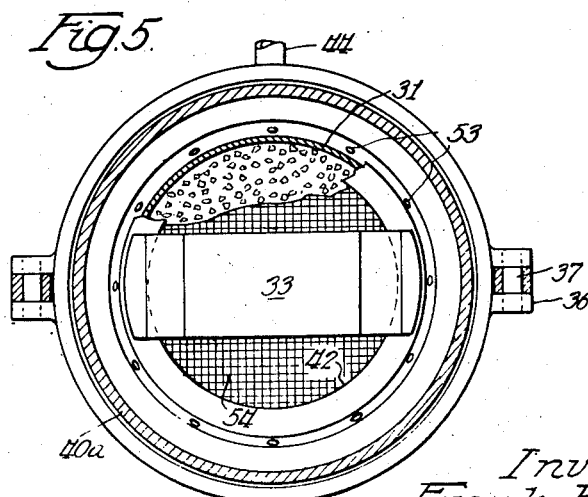
Fig. 5 is a horizontal section taken along line 5—5 of Fig. 4.

The supporting structure of the apparatus is in the form of a box-like enclosure which includes legs 10, a front wall 11, a back wall 12 and a top plate 13, together with suitable end walls. An extension of the back wall 12 provides a backboard 14 on which are mounted rings 15 for supporting glass bowls 16 and 17 which serve as reservoirs for the infusion.

The apparatus comprises generally water heating means which includes tanks 18, 19 and 20 which are disposed within the enclosure, as shown in Fig. 3, an extractor 21, and suitable means for causing the infusion to flow from the extractor to one or the other of the glass bowls 16 and 17.

The tanks are connected in series with each other by means of a conduit 22, which connects tanks 18 and 19, a conduit 23 which connects tanks 19 and 20, and a conduit 24 which connects tank 20 with the extractor 21. An inlet pipe 25 is provided for the tank 18 which can be connected to the water system by suitable means so that the water main pressure will be applied to the system comprising the tanks and the extractor.

A suitable heating device 26, such as a gas burner, is disposed beneath the tanks for heating the water contained therein. The tanks are cylindrical in shape and arranged in the form of a triangle as shown in Fig. 3, thus, the heat developed by the heating device will be applied to all three of the tanks. The cylindrical walls of the tank are spaced from each other to permit circulation of the hot gases and a suitable barrier 27 is provided to deflect the same into a suitable outlet flue, not shown.

As shown in Fig. 2, the inlet and outlet for each tank are disposed at opposite ends of the tank so as to reduce the commingling of the cold water with the hot water already in the tank, when water is withdrawn from the system. In the particular embodiment of the invention herein shown, the total capacity of three tanks is 4¼ gallons. It has been found that when the water in tank 20 has been brought up to about 195° to 200° F., that the temperature drop of the water in conduit 24 after three gallons of water have been withdrawn is only about 30° F.

The extractor 21 comprises an outer container 30 in which is disposed a removable cartridge 31 which includes a cover 32 which is screw threaded onto the cartridge proper. A suitable handle 33 secured to the cover is provided to facilitate insertion and removal of the cartridge.

The outer container 30 includes a sleeve 34 which is welded or otherwise suitably secured to the remainder of the container and which is formed of heavier material so as to take up the stresses developed during the sealing of the cartridge to the container. Screws 35 are pivotally mounted on the sleeve by means of bearings 36 which receive the journal portions 37 of the screws 35, the screws as a whole being T-shaped. Nuts 38 are threaded onto the screws and engage ears 39 which are carried by a cover 40. Thus, by tightening up the nuts 38, the cover 40 may be sealed to the outer container 30. The bottom of the removable cartridge is provided with a series of inlet holes 41, and the cover 32 is provided with one or more outlet apertures 42 in which a filter 54 is mounted. Conduit 24 is received within a suitable boss 43 formed in the bottom of the outer container 30, and is suitably sealed thereto so that hot water flowing from the conduit will pass upwardly through the cartridge 31, passing through the inlet holes 41, outlet apertures 42, and will flow out of the extractor through an outlet conduit 44.

Means are provided to seal the space between the walls of the outer container 30 and the removable cartridge 31 so that all of the water flowing through the extractor will be forced to flow through the cartridge. This means includes a ring 45 which is welded or otherwise suitably secured to the cartridge 30, and a gasket 46 which is confined between the lower surface of ring 45 and a lower seat 47 which is formed in the sleeve 34. A recess 48 is formed in the depending flange 40a of cover 40 and a sealing ring 49, formed of rubber or other suitable material, is mounted in a recess 48. The sealing ring bears against the upper surface 50 of ring 45 and against an upper seat 51 which is also formed on sleeve 34. The surfaces 50 and 51 are disposed at an angle to each other so as to make a V which serves to center the sealing ring 49 and to provide an equalizing effect so that the downward pressure developed by the tightening up of nuts 38 will be transmitted to both surfaces. The pressure transmitted to the surface 50 will be in turn transmitted downwardly through the ring to the gasket 46 to seal the space between the cartridge and the container. The pressure exerted by the sealing ring on the surface 51 will seal the cover 40 to the outer container 30 to prevent leakage. Thus a dual sealing effect is provided, and no pressure is transmitted through the relatively thin gauge sheet metal from which the removable cartridge 31 is fabricated, with the result that there is no possibility of damaging either the cartridge or container.

The ring 45 is provided with an outwardly facing annular recess 52 which registers with the outlet conduit 44. A plurality of passageways 53 are formed in the ring 45 so that the infusion may flow downwardly into the recess 52 and then into the outlet conduit 44, as shown by the arrows in Fig. 4.

A filter 54, which may be in the form of a stainless steel screen or wire mesh serves to retain the coffee grounds within the cartridge. In operation, the cartridge into which has previously been placed a measured amount of coffee, is placed in the outer container 30, and then the cover 40 is placed on the container. A handle 56 is provided for the cover. The cartridge is sealed in the container by means of the screws 35 and nuts 38. When hot water is caused to flow through the conduit 24, it passes upwardly through the cartridge and tends to pack the grounds against the filter. Thus, the coffee grounds themselves add to the filtering effect with the result that practically no sediment passes out of the cartridge. Since the flow of liquid is upwardly, the grounds are not packed as tightly as if the flow were downwardly, since the flow is against gravity. Furthermore, when the flow is upwardly, the coffee does not tend to cut channels through the grounds, with the result that a more uniform distribution of grounds and better filtering action is provided. To the extent that the coffee does pack itself in the container, it will be packed at the upper portion from which it can be readily removed by removal of the cover as contrasted with the packing in the less accessible bottom corners which would occur if the flow were downwardly.

In the event that the grounds evidence a tendency to become too tightly packed, the provision of a few holes 55 in the upper portion of the side walls of the cartridge will overcome this tendency.

The rate of flow is controlled primarily by the aperture area of the inlet holes 41 and 55 in combination with the choking effect provided by the packing of the coffee grounds. Where it is desired to extract at the rate of .3 to .4 gallon per minute, the inlet aperture area should be such as to permit a flow rate of about a gallon per minute, irrespective of the presence of coffee grounds. The aperture area of the outlet apertures 42 is sufficiently greater than the inlet area as to not cut down the flow rate appreciably.

It will be observed that the sealing ring 49 cooperates with the seat 51 to seal the outer container 30 irrespective of the presence of the cartridge 31; thus hot water can be caused to flow in one or the other of the glass bowls, instead of coffee, when desired, merely by sealing up the outer container without the cartridge.

As shown in Fig. 2, the outlet conduit 44 communicates with conduits 61 and 62 by means of a T connection 60. Valves 63 and 64 are provided for conduits 61 and 62 respectively so that the infusion can be directed to one or the other of the glass bowls 16 and 17. The valves 63 and 64 are controlled by knobs 65 and 66 respectively which project from the front wall 11.

The glass bowls 16 and 17 are received in sockets 67 and 68 respectively which are mounted in the top plate 13. Conduits 61 and 62 communicate with the sockets to provide an inlet for the bowls, and conduits 74 and 75 communicate with the sockets to provide an outlet for the glass bowls. The latter conduits terminate in spigots 76 and 77 respectively.

The socket construction is shown in detail in Fig. 3. The socket 68 may be in the form of a cup-shaped casting having suitable side openings for the conduits 62 and 75. Heating elements 69 are suitably mounted or embedded in the base of the socket so as to heat the coffee in the socket and in the bowl 17. A suitable thermostat 70 controls the action of the heating element 69 so that the coffee in the bowl will be maintained at the proper serving temperature, such as 175° to 200° F. A gasket 71 is mounted at the upper edge of the socket and is held in place by a confining ring 72. The bowl 17 is provided with a tapered neck 73 which is received within the socket, the gasket 71 serving to seal the connection between the glass bowl and the socket.

A valve 78 regulates the flow of hot water through the conduit 24 into the extractor 21. As shown in Fig. 3, a drain pipe 79 extends from the bottom of the outer container 30 so that the liquid remaining in the extractor after the bowl is filled, may be drained from the outer container, prior to the removal of the cartridge 31. A valve 80 is provided for the drain pipe 79.

To summarize the operation which has heretofore been described in detail in connection with the description of the various parts, the apparatus is connected to a water main by means of the inlet pipe 25 at the time of its original installation. In normal operation, the hot water valve 78 is closed. The cartridge 31 full of fresh coffee grounds is first placed in the outer container 30, and the cover 40 is then placed over the container and the parts are sealed by tightening up on the nuts 38. At this time, the drain valve 80 should be closed, and if it is desired to first fill the bowl 16 then valve 63 is opened and valve 64 is closed. The operator then opens the hot water valve 78 and permits hot water to run into the extractor 21, wherein the coffee is extracted and the resulting infusion goes into the glass bowl 16. This is done only after the water in the tanks 18, 19 and 20 has been brought up to the proper temperature, namely about 200° F. A suitable thermostatic control valve, not shown, can be provided for the heating device 26 so that the water in the tanks will be maintained at the proper temperature. Due to the fact that the three tanks are connected in series, and assuming that the amount of hot water required is approximately two-thirds of the total capacity of the three tanks, there will be very little temperature drop in the hot water used in extraction since the water that is withdrawn from tank 20 will be replaced by the water from tank 19 which is at about the same temperature at the time the extraction is commenced. The water withdrawn from tank 19 will in turn be replaced by water drawn from tank 18. Although there will be an appreciable temperature drop in the water contained in tank 18, this temperature drop will be reflected to a much smaller extent in tank 19 and to a still smaller extent in tank 20 assuming that the total quantity of water withdrawn is equal to the capacity of the last two tanks of the series. Thus, a much greater proportion of the caffeine will be extracted from the coffee grounds than if the water supply consists only of a single tank of equivalent capacity.

When the glass bowl 16 is filled, the operator closes the hot water valve 78 and then closes the bowl valve 63. The thermostatically controlled heating element 69 maintains the water in the socket 67 at a temperature which will set up convection currents in the bowl so that the coffee in the bowl will be maintained at the proper serving temperature. Coffee may be dispensed at will from the bowl by means of the spigot 76.

As soon as the bowl valve 63 has been closed, the operator may open the drain valve 80 thereby permitting all the liquid in the extractor to be drained out. A loosening of the nuts 38 will facilitate the draining action. The cover 40 and the cartridge 31 are then removed. The cartridge can then be cleaned and refilled or another cartridge replaced in preparation for making a second batch of coffee. The second batch may be made while coffee from the glass bowl 16 is still being dispensed, the second batch going into the glass bowl 17.

The glass bowls, when empty, may be readily removed from their sockets for cleaning. If preferred, they may be cleaned in place, merely by running hot water from the tanks through the extractor into one or the other of the bowls at a time when the container 30 is empty. This also serves to flush out the whole system with hot water. At such times, the cover 40 is sealed to the outer container 30 in the same manner as when the cartridge is present in the container. This is due to the arrangement of the sealing ring 49 which cooperates with the seat 51 of container 30 to seal the cover to the container irrespective of the presence of the sealing surface 50.

A needle valve 81 is also provided in the conduit 24, for instance, adjacent the control valve 78. The needle valve serves to regulate the pressure of the water flowing into the extractor. Since there is a considerable variation in pressure between various water supply systems, the operation of infusion apparatus would vary considerably from place to place, unless some such regulating means were provided. The rate of extraction is controlled primarily by the pressure drop occasioned by the packing of the coffee against the filter. If the water main pressure is too high, the packing will be too tight, and hence the rate of extraction will be cut down to an undesirable extent. Therefore, the needle valve can be set so as to provide the desired rate of extraction.

It has been found that the infusion apparatus herein shown and described operates satisfactorily for various beverages, other than coffee. For instance, it will serve to extract tea, and it can also be used in making cocoa. In the latter event, the extractor serves to disburse the cocoa powder uniformly in the water that is passing through the extractor, and the convection currents in the reservoir serve to maintain the dispersal or suspension of the cocoa.

I claim:

1. An extractor for coffee infusion apparatus comprising an outer container, a closed cartridge having substantially imperforate side walls removably disposed therein and substantially filling the lower portion of said outer container and adapted to contain the material to be extracted, a cover for said outer container having a depending flange forming a joint with said container, sealing means spaced below said joint and between the top of said cartridge disposed between said outer container and said cartridge to seal off the lower portion of the space therebetween from the upper portion of said space, means for urging said cover downwardly into sealing engagement with said outer container, means for transmitting downward pressure from said cover to said sealing means so that said sealing means can be compressed without transmitting compressive force through the wall of said cartridge, said sealing means comprising an upwardly facing annular shoulder on the inner wall of said outer container and a gasket confined between said shoulder and said pressure transmitting means, inlet means for said container located at a point below said sealing means, and outlet means for said container located at a point above said sealing means so that the flow of water through said container and cartridge will be upwardly.

2. An extractor as claimed in claim 1 in which said cartridge is provided with an inlet opening below said sealing means and an outlet opening disposed above said sealing means, and a filter overlying said outlet opening, said upward flow causing the solid material disposed in said cartridge to be carried upwardly against said filter so that a pressure drop will occur at said filter when liquid is forced through said extractor.

3. An extractor as claimed in claim 2 in which said inlet opening is formed in the bottom wall of said cartridge, and in which the side wall of said cartridge is provided with a series of second inlet openings disposed in the upper portion thereof, but beneath said sealing means whereby the tendency of solid material disposed in said cartridge to become tightly packed in the upper portion of said cartridge may be diminished.

4. An extractor for coffee infusion apparatus comprising an outer container of substantially cylindrical shape, a cylindrical cartridge removably disposed therein and substantially filling the lower portion of said outer container and adapted to contain the material to be extracted, a cover for said outer container having a depending flange forming a joint with said container, sealing means carried by said outer container and spaced below said joint and disposed between said outer container and said cartridge to seal off the lower portion of the space therebetween from the upper portion of said space, means for urging said cover downwardly into sealing engagement with said outer container, and means for transmitting pressure from said cover to said sealing means so that said sealing means can be compressed without transmitting compressive force through the wall of said cartridge, said pressure transmitting means including a ring-shaped member mounted on the wall of said cartridge and having an upwardly and outwardly facing sealing surface, said outer container being provided with an upwardly and inwardly facing sealing surface at a point adjacent said first-mentioned sealing surface, and said flange being providing with a downwardly facing sealing ring which engages both of said sealing surfaces in order to seal the cover to said pressure transmitting means, said ring-shaped member being provided with an outwardly facing annular recess providing an annular conduit, outlet means formed in the wall of said outer container and registering with said annular conduit, communication providing means extending through the upper portion of said ring-shaped means and by-passing said first-mentioned sealing surface to provide communication between said conduit and the space between said cover and the upper portion of said cartridge, and inlet means formed in the wall of said container at a point below said sealing means.

References Cited in the file of this patent

UNITED STATES PATENTS

| | | |
|---|---|---|
| Re. 19,566 | Valls | May 7, 1935 |
| Re. 22,022 | Peters | Feb. 10, 1942 |
| Re. 22,879 | Peters et al. | May 13, 1947 |
| 514,988 | Childs | Feb. 20, 1894 |
| 663,723 | Brown et al. | Dec. 11, 1910 |
| 1,035,099 | Paone | Aug. 6, 1912 |
| 1,335,048 | Diefendorf | Mar. 30, 1920 |
| 1,412,388 | Clermont | Apr. 11, 1922 |
| 1,491,196 | Cannone et al. | Apr. 22, 1924 |
| 1,552,565 | Morton et al. | Sept. 8, 1925 |
| 1,553,644 | Still | Sept. 15, 1925 |
| 1,774,980 | Lambert | Sept. 2, 1930 |
| 1,809,899 | Heroy | June 16, 1931 |
| 1,947,426 | Smith | Feb. 13, 1934 |
| 2,016,281 | Harper et al. | Oct. 8, 1935 |
| 2,024,859 | Hillseth | Dec. 17, 1935 |
| 2,093,316 | Fowler | Sept. 14, 1937 |
| 2,227,540 | Fry | Jan. 7, 1941 |
| 2,234,464 | Caldor | Mar. 11, 1941 |
| 2,500,390 | Wales | Mar. 14, 1950 |

FOREIGN PATENTS

| | | |
|---|---|---|
| 4,501 | Great Britain | 1878 |
| 348,835 | Italy | June 1, 1937 |
| 438,184 | Great Britain | Nov. 12, 1935 |
| 498,559 | Great Britain | Jan. 10, 1939 |
| 559,102 | Great Britain | Feb. 3, 1944 |
| 618,676 | Great Britain | Feb. 25, 1949 |